April 28, 1959  R. N. HAYNIE  2,883,846
METHOD FOR MANUFACTURING FIBROUS FLUID SEALING ELEMENTS
Filed July 27, 1956  2 Sheets-Sheet 1

April 28, 1959 R. N. HAYNIE 2,883,846
METHOD FOR MANUFACTURING FIBROUS FLUID SEALING ELEMENTS
Filed July 27, 1956 2 Sheets-Sheet 2

United States Patent Office 2,883,846
Patented Apr. 28, 1959

2,883,846

METHOD FOR MANUFACTURING FIBROUS FLUID SEALING ELEMENTS

Robert N. Haynie, Mountain View, Calif., assignor to Federal-Mogul-Bower Bearings, Inc., Detroit, Mich., a corporation of Michigan Application July 27, 1956, Serial No. 600,448

4 Claims. (Cl. 69—21)

This invention relates to an improved method for manufacturing fluid seals of the type employing leather or similar material as the sealing element. It relates particularly to the type of fluid seal in which the leather sealing element is of the so-called "barrel" type; that is, the element is provided with a generally frusto-conical lip portion adjoining a radially outer axial portion which, in turn, is secured in a rigid case.

The manufacture of barrel-type sealing elements has been difficult, has wasted a large amount of leather, and has been fraught with inaccuracies. Heretofore, a disk of leather was punched from a hide, coated or impregnated, if desired, with suitable material, and molded into something resembling a hat with a solid crown portion, from which was drawn the frusto-conical and axial portions. The actual sealing element then had to be obtained by trimming off the uneven outer edge and trimming off all the crown portion, using knives. The trimming was awkward, due to the shape of the leather, and often the inner or outer peripheries were ragged or were not concentric with each other. Also, the leather in the crown portion was almost entirely wasted since it could be used only for making seals considerably smaller in size than the original seal, and the trimmings from the outer portion were entirely waste. Yet the crown portion was essential in prior-art methods because it was the part that was held during the drawing, and the outer excess portion was unavoidable because the exact size of the drawn rim could never be known in advance.

An important object of the invention is to provide a revolutionary new process for making annular sealing elements of the barrel-type from leather and similar materials. In this process there is no after-trimming; the sealing element is formed from a ring or annulus of leather whose inner and outer peripheries are cut to an exact size, as determined by the size of the inner and outer peripheries in the finished sealing element. Then, this ring is drawn in a novel mold without positively clamping any part during the shaping but permitting the entire ring to be drawn directly into the final shape. Then the leather, if coated or impregnated with vulcanizable material, is cured for the desired time.

Another object of the invention is to reduce considerably the amount of waste involved in making barrel-type annular leather sealing elements.

Another object of the invention is to eliminate many steps heretofore necessary in making leather sealing elements such as drilling a hole through the center of the crown portion, trimming off the crown and the outer rim portion, and sorting the sealing elements from their trimmings.

Another object of the invention is to provide an improved finished product having accurate inner and outer peripheries and having them concentric with each other.

Other objects and advantages of the invention will appear from the following description of a preferred embodiment thereof.

*The method of the present invention*

Figure 1:
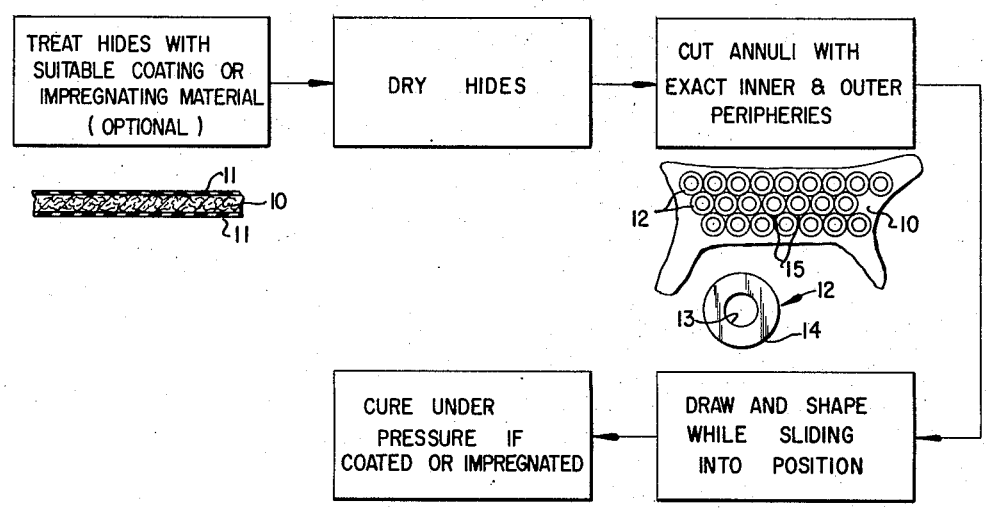
Fig. 1 is a flow sheet illustrating a preferred process embodying the principles of the present invention, with accompanying diagrammatic sketches further illustrating some of the steps.

In a typical example of how to practice the invention, as shown in the flow sheet of Fig. 1, leather is supplied in the form of hides as the fibrous material to be treated. Preferably, the hide 10 is coated with a suitable coating compound 11, normally some heat-curable material, such as one of the synthetic rubber compositions disclosed in Patent No. 2,854,267, granted September 30, 1958, to Clifford A. Stephens and Robert W. McCandless, though other materials may be used. Alternatively, the leather may be impregnated with a suitable material, or may be left without coating or impregnation.

Next, hide 10, coated or not, is, preferably, fully dried, because I have found that a piece cut from a dry hide will regain its original dimensions even if it should subsequently get wet; whereas, if it is not dried before cutting retention of shape is not assured, and the inner and outer periphery of a ring cut from the hide may not be accurate enough for the final seal without additional trimming, and one purpose of the present invention is to eliminate such trimming.

From the dry hide 10, coated or impregnated or uncoated and unimpregnated, a series of leather washers or rings 12 are then cut, each having an inner periphery 13 and an outer periphery 14. The portion cut out from the inner periphery 13 is still flat and may be used in making seals of smaller sizes. The accuracy of the present invention and the fact that there is no further trimming of the outer peripheral edge means a considerable reduction in waste material as compared with former methods. The main scrap left after cutting the washers from the hide are the portions 15 in between the leather rings 12, and these are much smaller than they were heretofore because the outer periphery 14 is cut accurately instead of being cut oversize.

If desired, the washer 12 may be coated (or impregnated) with the material 11 after being cut, instead of before, this having the advantage of coating the inner and outer peripheral edges where that is desirable. Where it is not desirable or necessary to coat the peripheral edges, it is preferable to coat the hide before cutting. The washer surfaces, in either event, are preferably further treated by applying a small film of mold release material, such as zinc stearate, to prevent later sticking in the mold. Any suitable mold release material may be used in this step, and the step may often be omitted, just as the coating or impregnating step may, in many instances, be omitted since it is often unnecessary to have coated or impregnated leather. Normally, properly prepared coated material will make a better seal, but there are many applications where this is unnecessary and undesirable, and the invention applies to them just as well as to those where coating is done, though the coated form is shown in the drawings, by way of example.

The next step is to position the washer 12 between the two halves of a mold, arranging it in relation to the mold so that during the closing of the mold the outer rim of the washer will be drawn to the desired shape and the inner rim will be drawn slightly outwardly while being formed into a frusto-conical shape. This is done in what is, in fact, a single operation of closing two mold halves against each other. The inner and outer peripheral edges 13, 14 are preferably confined by the mold so as to eliminate the chance of inaccuracy from unbalanced floating. During this drawing operation, no part of the leather washer 12 is clamped; all parts are free to slide until the mold is completely closed, and then all of it is clamped at once, simultaneously. The washer 12 is, in effect, slid over a frusto-conical surface and folded over an axial surface during the closing of the mold. When the mold is closed, the sealing element 20 has been formed, and it is held in this position until the coating or impregnation, if any, is cured, the exact time and temperature depending upon the material being used and upon the preference of the manufacturer. With one preferred coating material 17, the cure normally takes about 45 seconds at 240° F.

Figure 2:
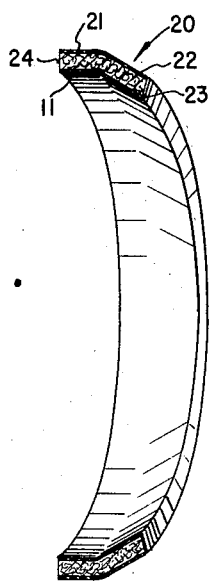
Fig. 2 is an enlarged perspective view, partly in section, of a leather sealing element embodying the principles of the invention.

The method of Fig. 1 thus results in a leather sealing element 20 of Fig. 2 requiring no trimming whatsoever. There is an axial portion 21, which is to be held in the case on further assembly, and there is a frusto-conical lip portion 22. This is normal in this type of seal. The inner peripheral edge 23 of the frusto-conical lip 22 is the inner periphcry 13 of the disk 12, reformed, and the outer peripheral edge 24 of the axial flange 21 is the reformed outer periphery 14. The simple shape of the element, the fact that there is no radial flange, and the economy of the method of manufacture make it a very practical unit to apply into a case.

Figure 3:
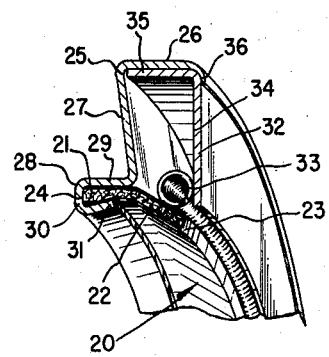
Fig. 3 is an enlarged view in elevation and in section of a finished oil seal embodying the principles of the present invention.

An example of how the completed seal can be made is shown in Fig. 3. Here the sealing element 20 of Fig. 2 is held in an outer case element 25. The outer case 25 is provided with an outer axial flange 26, a radially inwardly extending frusto-conical flange 27, and a grip portion 28 formed at the inner end thereof and comprising an axially extending portion 29, a radially extending portion 30 and a crimped-back portion 31 which bites into the axial flange 21 of the sealing element 20. An inner case element 32 is used to maintain in place a spring 33 which urges the sealing lip 23 against the shaft. The inner case element 32 may have an axial flange 34 and a radial flange 35 and be held by a curled-over portion 36 of the outer case element 25. The simple crimping operation is art that is well-known and need not be described.

*The apparatus and its application in the method to manufacture the product*

Figs. 4, 5, 6 and 7 illustrate the molding operation of an apparatus which is preferred in the exercise of the present invention. The mold consists basically of two parts, an upper element 41 and a lower element 42. These elements may be secured to platen 43, 44 as by central bolt 45, 46 through central openings 47, 48 in the mold halves 41, 42 and threaded into the platens 43, 44.

The lower mold half 42 is a generally annular member with a generally cylindrical outer periphery 50 and a radial face 51 at its upper end. It is stepped-down from this upper face 51 by a short cylindrical portion 52 to a narrow radial shelf 53 where the inner portion of the washer 12 is inserted and rests before the mold is closed. The outer edge of the shelf 53 meets a lip-forming frusto-conical portion 54 preferably extending at 30 degrees with respect to the axis of the mold half 42, which terminates after the exact length of the radially inner portion of the lip 22 in another cylindrical portion 55. The portion 55 extends for the exact length of the cylindrical flange 21 and terminates at a radial shelf 56 leading to the outer periphery 50 of the mold half 42. The width of the shelf 56 is the same as the thickness of the seal element 20.

Figure 7:
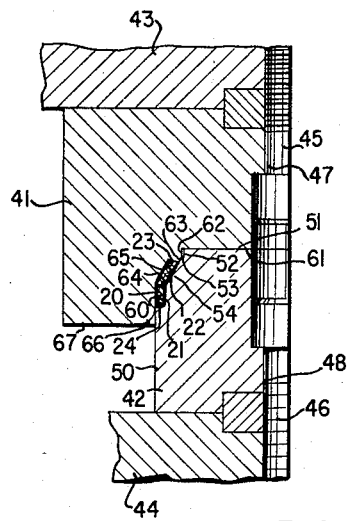
Fig. 7 is a view similar to Fig. 6 with the mold in its fully closed position.

The upper half 41 of the mold is also formed with a cylindrical portion 60 adapted to slide snugly around the lower mold half periphery 50, a radial face 61 adapted to abut against the face 51 surrounded by an inner cylindrical portion 62 adapted to encircle the cylindrical portion 52 when the mold is closed. The inner cylindrical portion 61 terminates in a short radially outwardly extending frusto-conical portion 63 parallel to and adapted to mate against the upper end of the frusto-conical portion 54. The portion 63 is joined to a radially-outer frusto-conical portion 64 inclined at the same angle by still another frusto-conical portion 65 which extends in the opposite direction axially from the portions 63 and 64 and is designed to confine the inner peripheral edge 23 of the sealing lip 22. This portion 65 preferably extends at an angle of about 15 degrees relative to the radial plane. The cylindrical portion 60 meets the outer end of the portion 64 and itself ends in a radius portion 66 leading to a radial face 67. The radius portion 66 acts to engage the ring 12 and deflect it into the desired shape. The parts are so constructed that, as seen in Fig. 7, the edges 54, 55, 56, 60, 64 and 65 will fully confine the sealing member when the mold is closed.

*Operation of the mold*

Figure 4:
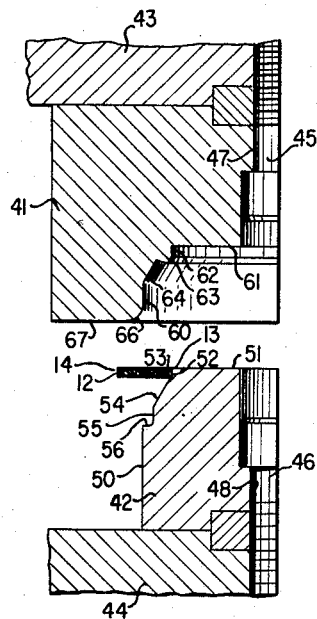
Fig. 4 is a view in elevation and in section of one-half of a leather molding apparatus which may be used in the method embodying the principles of the invention, shown in open position with a flat leather ring inserted in place.
Figure 5:
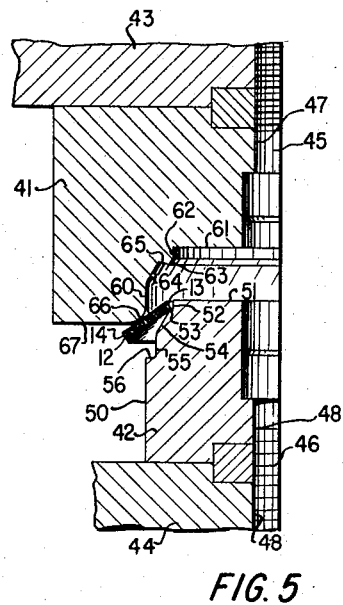
Fig. 5 is a view similar to Fig. 6 with the mold partially closed.
Figure 6:
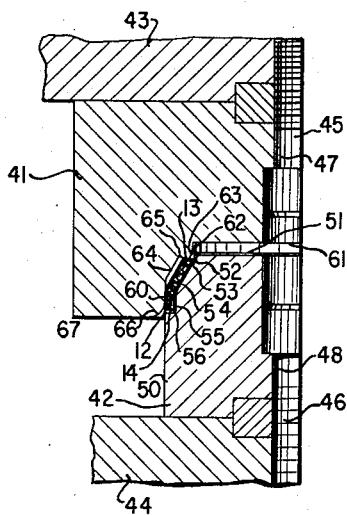
Fig. 6 is a view similar to Fig. 5 with the mold more fully closed.

Fig. 4 shows the mold in its open position. A leather washer 12 is normally placed so that its inner periphery 13 rests on the short radial shoulder 53. As the mold closes (see Fig. 5), the curved lower edge 66 engages the radially outer portions of the washer 12 and deflects them downwardly, operating at the same time to draw out the washer's inner radius.

Further closing of the mold (see Fig. 6), generally conforms the leather to the shape of the lower mold half 42 and confines its outer periphery 14 to the edge portion 56. The washer is still not fully shaped and is still free to be drawn to the finished shape during this closing procedure, but this is being done gradually and without having to clamp any portion of the washer 12.

Fig. 7 shows the fully closed mold, and we noted that the inner and outer peripheries 23 and 14 of the seal 20 are confined by the mold portions 56 and 65, and the lip 22 is confined between the portions 54, 65, and 64. The axially extending flange 21 is confined between the portions 55, 56, and 60. As the result, the element is shaped into a finished barrel element 20 without having to hold any portion of the sealing element rigidly during the formation of it and without having to employ any portion that must later be trimmed off.

A feature of the present invention is that the element 20 is made from a flat washer 12 whose inner and outer peripheries 13, 14 are cut to provide the exact inner and outer peripheries 23, 24 desired in the finished sealing element 20. Since the hide 10 has been dried, the inner and outer peripheries of the finished member are very accurate.

To those skilled in the art to which this invention relates, many additional changes in construction and widely differing embodiments of the invention will suggest themselves without departing from the spirit and scope of the invention as defined in the claims.

What is claimed is:

1. A method for making a leather sealing element for a fluid seal from a planar member in the form of an annulus having an inner and outer periphery, comprising the steps of bending the outer marginal portion of the member in an axial direction to abut its outer peripheral edge against a relatively fixed surface, deflecting the inner marginal portion of the member into the shape of the frustum of a cone and compressing the inner marginal portion of the member in a direction normal to its surfaces while applying pressure against the inner peripheral edge of the member.

2. A method for making a leather sealing element for a fluid seal from a planar member in the form of an annulus having an inner and outer periphery, which comprises the steps of bending the outer marginal portion of the member in an axial direction, deflecting the inner marginal portion of the member into the shape of a frustum of a cone and compressing the inner marginal portion of the member in a direction normal to its surfaces while confining the inner and outer peripheral edges thereof.

3. A method for making a leather sealing element for a fluid seal from a planar member in the form of an annulus coated with uncured vulcanizable material and having an inner and outer periphery, comprising the steps of bending the outer marginal portion of the member in an axial direction to abut its outer peripheral edge against a relatively fixed surface, deflecting the inner marginal portion of the member into the shape of the frustum of a cone and compressing the inner marginal portion of the member in a direction normal to its surfaces while applying pressure against the inner peripheral edge of the member and curing said material, to cause the member to retain its acquired shape.

4. A method of making a leather sealing element for a fluid seal from a planar member in the form of an annulus coated with uncured vulcanizable material and having an inner and outer periphery, which comprises the steps of bending the outer marginal portion of the member in an axial direction, deflecting the inner marginal portion of the member into the shape of a frustum of a cone and compressing the inner marginal portion of the member in a direction normal to its surfaces while confining the inner and outer peripheral edges thereof and curing said material, to cause the member to retain its acquired shape.

References Cited in the file of this patent

UNITED STATES PATENTS

| | | |
|---|---|---|
| 898,526 | Swan | Sept. 15, 1908 |
| 956,612 | Venn | May 3, 1910 |
| 1,386,601 | Crossett | Aug. 9, 1921 |
| 1,411,913 | Gardner | Apr. 4, 1922 |
| 1,443,311 | Cook | Jan. 23, 1923 |
| 1,461,902 | Holmes | July 17, 1923 |
| 1,667,673 | Pierson et al. | Apr. 27, 1928 |
| 1,740,388 | Bohne | Dec. 17, 1929 |
| 1,830,272 | Griffith | Nov. 3, 1931 |
| 2,250,888 | Chandler | July 29, 1941 |
| 2,468,616 | Coppola | Apr. 26, 1949 |